J. WRIGHT & G. F. KRICK.
FEED BAG SUPPORT.
APPLICATION FILED AUG. 24, 1910.
1,018,225.
Patented Feb. 20, 1912.
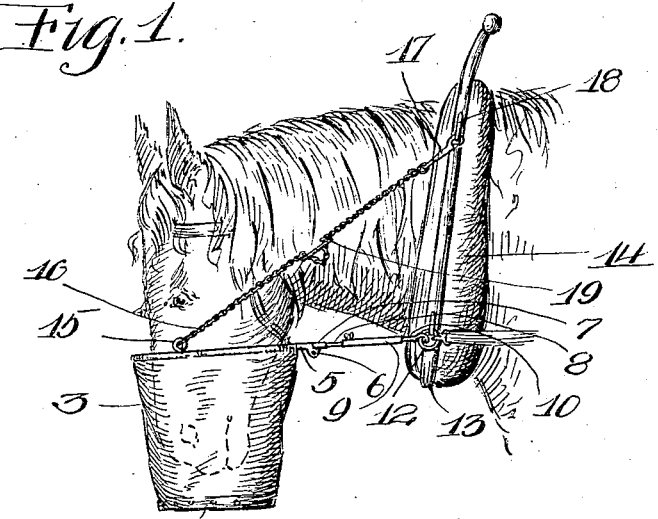
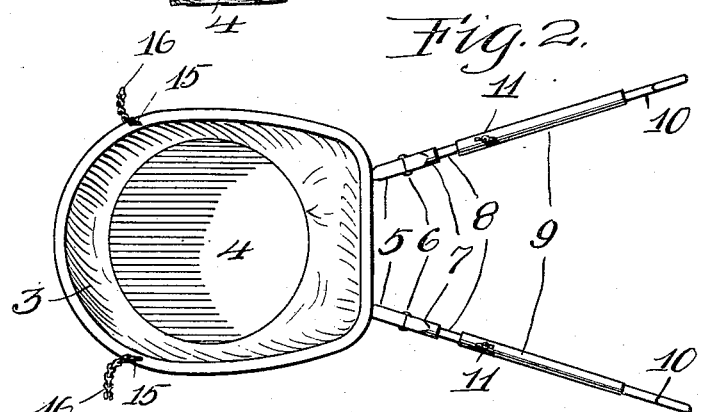
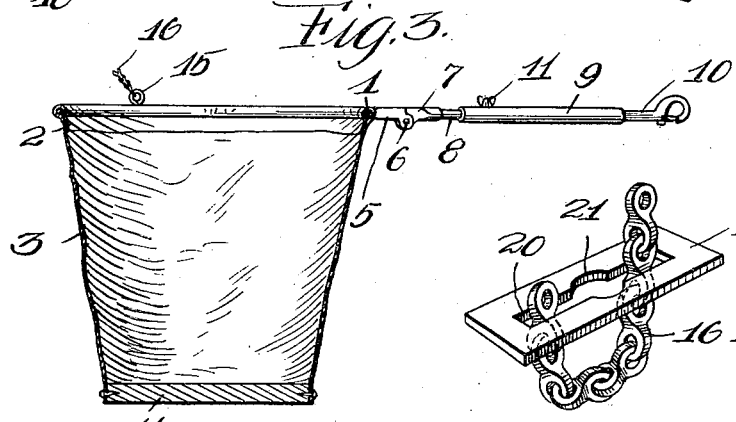
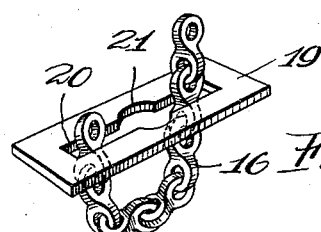

UNITED STATES PATENT OFFICE.

JOSEPH WRIGHT AND GEORGE F. KRICK, OF PITTSBURGH, PENNSYLVANIA; SAID WRIGHT ASSIGNOR TO SAID KRICK.

FEED-BAG SUPPORT.

1,018,225.      Specification of Letters Patent.      Patented Feb. 20, 1912.

Application filed August 24, 1910. Serial No. 578,677.

*To all whom it may concern:*

Be it known that we, JOSEPH WRIGHT and GEORGE F. KRICK, citizens of the United States of America, residing at N. S. Pittsburgh, in the county of Allegheny and State of Pennsylvania, have invented certain new and useful Improvements in Feed-Bag Supports, of which the following is a specification, reference being had therein to the accompanying drawing.

This invention relates to feed bag supports, and the primary object of our invention is to provide positive and reliable means, as will be hereinafter set forth, for supporting a feed bag in proximity to the head of a horse, whereby the horse can easily obtain the contents of the bag, without necessarily confining the position of the bag or the horse's head.

Another object of our invention is to provide simple, durable, and inexpensive means for supporting a feed bag relatively to a horse's head, the means employed for this purpose being adjustable whereby the bag can be correctly positioned irrespective of the size of the animal.

A further object of the invention is to provide a sanitary feed bag that will permit of an animal feeding at will, thus allowing the proper amount of air being obtained during the feeding, besides obviating the necessity of using stalls or permanent receptacles, either separate of the vehicle or the tongue thereof.

With the above and such other objects in view as may hereinafter appear, the invention consists of the novel construction, combination, and arrangements of parts to be hereinafter specifically described and then claimed.

Reference will now be had to the drawing, wherein:

Figure 1 is a side elevation of the feed bag support. Fig. 2 is a plan of the feed bag. Fig. 3 is a longitudinal sectional view of the same, and Fig. 4 is a perspective view of a take-up device used in connection with the support.

In the drawing the reference numeral 1 denotes an irregularly shaped ring or rim and attached to this ring are the upper edges 2 of a flexible feed bag or receptacle 3 having a flat bottom 4, the bag or receptacle 3 being preferably made of canvas or a durable material and the bottom 4 thereof of wood or a light material. The irregularly shaped ring 1, which is preferably made of metal, has the rear side thereof provided with rearwardly extending arms 5 and hinged or otherwise connected to the outer ends of these arms, as at 6, are the enlarged ends 7 of rods 8, said rods being disposed radially relatively to the vertical axis of the feed bag or receptacle 3. Slidably mounted upon the rods 8 are the rearwardly extending sleeves 9 of snap hooks 10, said sleeves being fixed upon the rods 8 by set screws 11, thus allowing the distance between the snap hooks 10 and the feed bag or receptacle 3 to be shortened or lengthened, as occasion may demand. The snap hooks 10 are of a conventional form and are connected to the tug or trace links 12 of the hames 13 of a collar 14, although the snap hooks can be connected to rings or staples especially provided therefor upon the hames.

The irregularly shaped ring 1 is provided with oppositely disposed eyelets 15 and connected to said eyelets are chains, cables, or flexible connections 16 having the ends thereof provided with snap hooks 17 adapted to be connected to the check rein or driving rein terrets 18 of the hames 13. It is preferable to use chains and in connection with each chain there is a take-up device, comprising an oblong plate 19 provided with a longitudinal slot 20, said slot intermediate the ends thereof having the walls thereof recessed, as at 21, to provide an opening of larger area than the ends of the slot, whereby the chain can freely pass through said opening and then be shifted into the ends of the slot to frictionally engage the side walls of the plate 19. It is through the medium of the take-up device in connection with each chain that permits of the chains being lengthened or shortened in order to support the feed bag in a horizontal position, whereby the horse can easily place his head in the feed bag to obtain the contents thereof.

From the foregoing it is apparent that the feed bag is entirely free of the horse's head, that the contents of the bag are not necessarily confined around the mouth of the horse, and that the bag can be easily and quickly adjusted for use in connection with horses of various sizes. Insomuch that the bag is supported from the horse's collar and entirely free of the head, the head can be easily moved out of the bag, thus allowing the horse to obtain air, which is conducive to a proper digestion of the food contained within the bag.

When the feed bag is not in use the rods 8, the adjustable sleeves 9 and the snap hooks 10 carried by said sleeves can be easily folded under the bag after the same is collapsed, thus permitting of a driver easily handling the same and storing it away in the vehicle when not in use.

While in the drawings we have illustrated what we believe to be a practical embodiment of our invention, we still reserve the rights to make such variations in the structural elements as fall within the scope of the appended claim.

What we claim, is:

In combination, a collapsible feed bag having a substantially rigid bottom, an irregularly-shaped ring at the mouth of said bag and forming a support therefor, a pair of diverging arms carried by said ring and each having a hinge joint intermediate its ends, said joint being formed to permit folding movements of the free ends of the arms in a direction to approach the under side of the ring, the axis of movement being on or parallel to the plane of the ring, whereby said ring and arms will form opposing members between which the bag may be collapsed when the device is folded, said arms having means for removable attachment to the harness of the animal, and supporting members carried by the ring and also adapted to be secured to the harness.

In testimony whereof we affix our signatures in the presence of two witnesses.

JOSEPH WRIGHT.
GEORGE F. KRICK.

Witnesses:
KARL H. BUTLER,
DAVID FURNIER.

Copies of this patent may be obtained for five cents each, by addressing the "Commissioner of Patents, Washington, D. C."